United States Patent [19]

Cole

[11] 4,077,292

[45] Mar. 7, 1978

[54] GUIDING ASSEMBLY FOR A PORTABLE POWER TOOL

[76] Inventor: Eugene E. Cole, R.D. No. 3, Box 485, Apollo, Pa. 15613

[21] Appl. No.: 670,656

[22] Filed: Mar. 26, 1976

[51] Int. Cl.² .............................................. B27B 9/04
[52] U.S. Cl. ...................................... 83/745; 30/372; 83/455
[58] Field of Search ....................... 83/745, 454, 455; 30/371, 372

[56] References Cited

U.S. PATENT DOCUMENTS

| | | | |
|---|---|---|---|
| 1,911,045 | 5/1933 | Tinnen | 83/454 |
| 2,677,399 | 5/1954 | Getsinger | 83/745 |
| 2,773,523 | 12/1956 | Hopla | 83/745 |
| 3,864,830 | 2/1975 | Haddon | 83/745 X |

*Primary Examiner*—Willie G. Abercrombie
*Attorney, Agent, or Firm*—Webb, Burden, Robinson & Webb

[57] ABSTRACT

A portable power tool having a sole plate for contacting a workpiece along which a straight line is to be cut has an attachment for the sole plate which includes means for supporting a guiding means which is adjustable with respect to the supporting means to cooperate with a longitudinal guide member releasably attached to the workpiece. The guide member may be angle iron, channel iron, I-beam or other similar configuration conveniently available to a workman and not especially designed to be used with the attachment.

18 Claims, 5 Drawing Figures

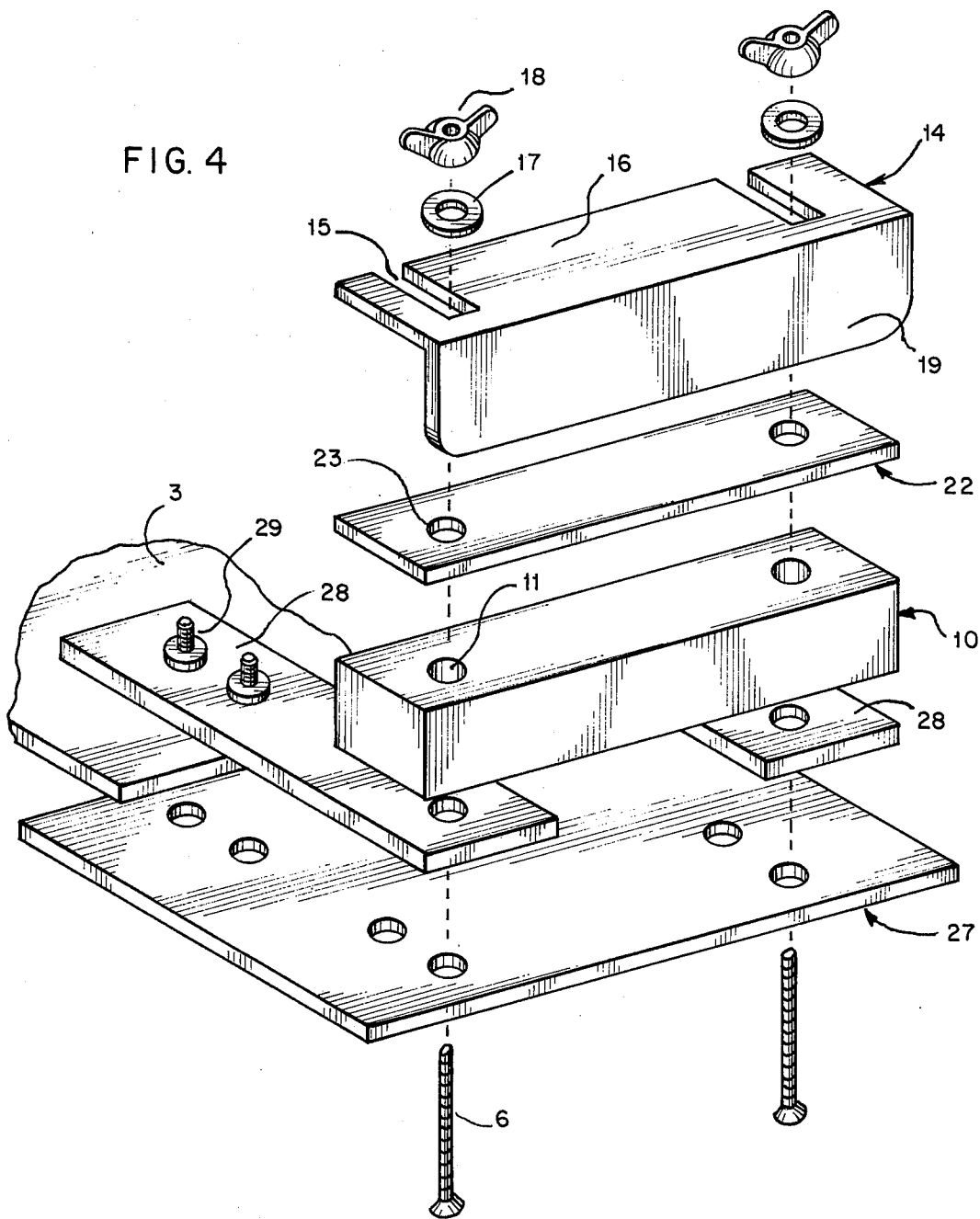
FIG. 4
FIG. 5
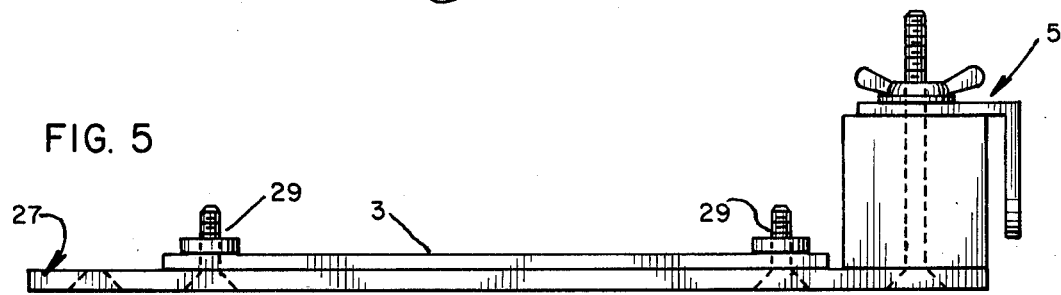

GUIDING ASSEMBLY FOR A PORTABLE POWER TOOL

This invention relates to a guiding assembly for a portable power tool, such as a circular saw, jig saw, router, or the like and particularly to an attachment for such a tool which is conveniently ajustable for use with any guide member conveniently available to a workman.

Heretofore, it has long been the usual practice to cut a straight line along a workpiece using as a guide a wooden or metal straight edge against which the cutting blade of a portable power tool was aligned. Two difficulties with such a guide are that, in the case of a long cut, the tool tends to wander or drift away from the straight edge, or the tool may slip beneath the guide. To overcome these problems, many artisans have designed various types of attachments for portable power tools, the most common of which utilizes a rigid member which is adapted to slide along a guide member which is releasably attached to the workpiece, for example as shown in U.S. Pat. No. 1,911,045. Although such an attachment is satisfactory for use with a particular guide having dimensions specifically designed to cooperate with the attachment for the power tool, such attachments have not found general acceptance since they require a workman to have available at all times the specific guide for which the attachment is designed.

To overcome this limitation, I have invented a guiding assembly which is adapted for use with and includes any convenient guide member which is adapted to be secured to a workpiece in such a way that a leg of the guide member extends upwardly from the workpiece, as will be more particularly described hereinafter. My guiding assembly includes an attachment for a power tool which is fully adjustable in both the lateral and vertical directions to enable the attachment to be utilized with such guide members, whether they comprise angle iron, channel iron, I-beam or other similar configuration. My guiding assembly is easily attached to and removed from a portable power tool. It utilizes only a few components, and therefore can be inexpensively made. Since the attachment fastens directly to the sole plate of a portable power tool, no substantial modification of the tool is required. The attachment may be made in whole or in part of metal, durable plastic or any other rigid synthetic material, such as tempered masonite or the like.

In a modification of the invention, the distance between the cut to be made by the power tool and the guide member which is releasably secured to the workpiece can be varied as desired by the use of auxiliary members.

An understanding of the invention will become apparent from a reading of the following specification, when taken with the accompanying drawings in which:

FIG. 4 is an enlarged partial perspective of another embodiment of the invention showing the elements comprising the attachment for use on an auxiliary plate extended from the sole plate of a power tool; and FIG. 5 is an elevation view showing a still further embodiment of the invention in which an auxiliary plate extends entirely across the sole plate of a portable power tool.

Figure 1:
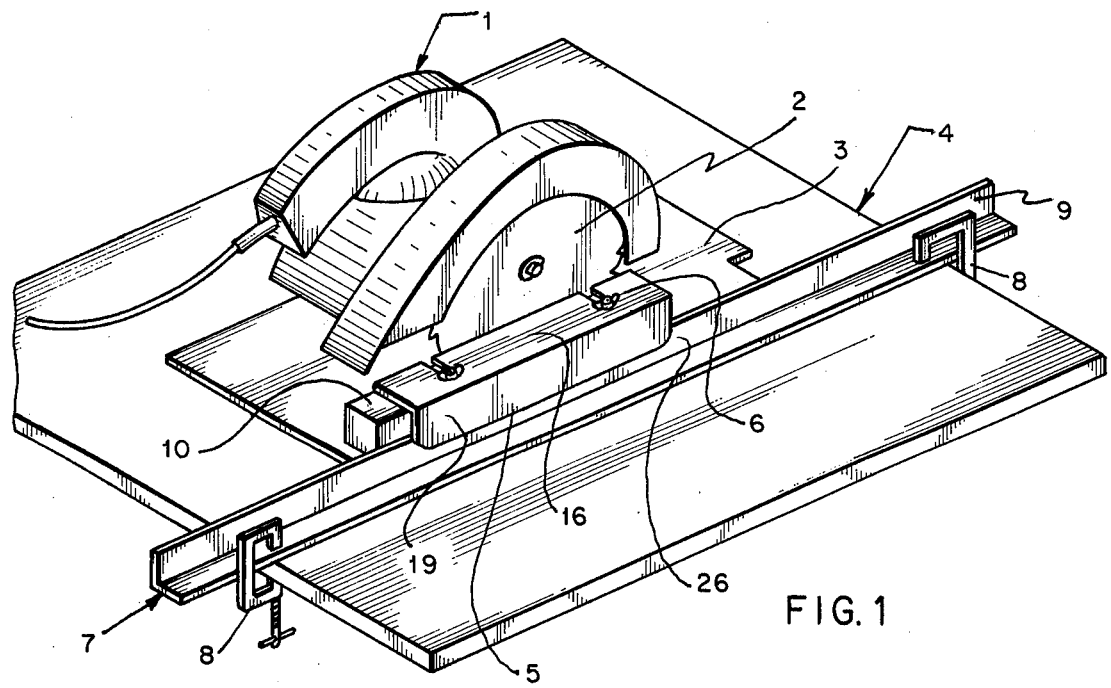
FIG. 1 is a perspective view of a portable power tool, i.e. a circular saw, having the guiding assembly according to the invention.

Referring to FIG. 1, a portable power tool, such as the circular saw 1 shown, a jig saw, router, or the like, has a cutting blade 2 which is adapted to rotate through a sole plate 3 of the tool to cut a workpiece 4. In order to cut a straight line across the workpiece, particularly in the case of long cuts to be made, an attachment 5 is secured to the sole plate 3 of the power tool by fasteners, such as threaded bolts 6, as will be more fully described hereinafter. A guide member in the form of an angle iron 7 is releasably secured at opposite sides of the workpiece to the workpiece by clamps 8. A straight line cut is made across the workpiece by engaging the attachment 5 with upstanding leg 9 of the angle iron to provide a guiding assembly at one side of the workpiece and moving it in the direction of the guide member across the workpiece.

Figure 2:
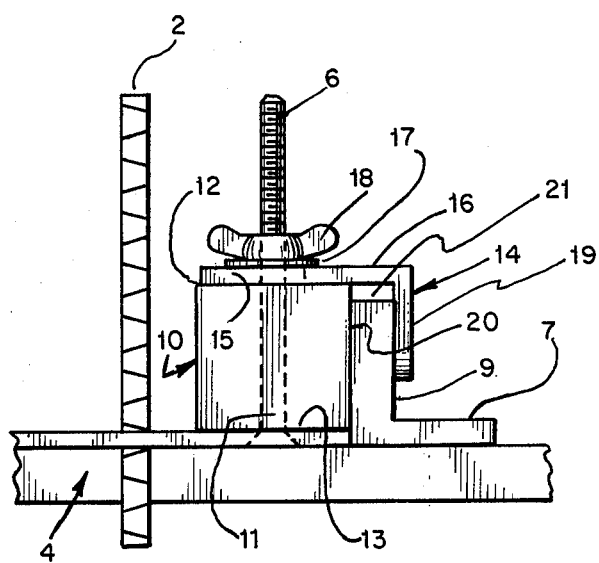
FIG. 2 is a partial end view of the attachment and a guide member in the form of an angle iron.

A preferred attachment as shown in FIG. 2 comprises a supporting means including a longitudinal channel 10 having a rectangular cross section. The channel 10 may be made of metal, plastic, or other rigid material. There are holes 11 in opposite top face 12 and bottom face 13 at both ends of the channel. A guiding means comprising an angle 14 is attached to the top face 12 such that slots 15 in a first leg 16 of the angle at both ends of the channel are aligned with the holes 11 in the channel. Threaded bolts 6 are inserted from below the sole plate through the holes 11 in the channel and through the slots 15 in the first leg of the angle. Each bolt preferably has a washer 17 and bolt assemblies are secured by wing nuts 18 threaded to the bolts. The angle 14 also has a depending or second leg 19 which extends substantially parallel to a side face 20 of the channel and the space 21 between the second leg 19 and the side face 20 of the channel is adjusted by moving the angle 14 relative to the channel. After the appropriate distance is established the wing nuts 18 are tightened to secure the relative positions of the elements of the attachment. The space 21 between the inside of the second leg 19 and the face 20 of the channel is selected in accordance with the width of a guide member to be engaged therebetween.

The guide member may be, as shown in FIGS. 1 and 2, an angle iron comprising L-shaped longitudinal member 7 having an upstanding leg 9 which is slidably received in the space 21 between the channel and the second leg 19. The maximum width of leg 9 of the angle to be engaged therebetween is limited only by the maximum distance that the inside of the depending leg 19 and the channel face 20 can be spaced. This, of course, depends upon the width of the first leg 16 and the length of the slots 15 therein.

Figure 3:
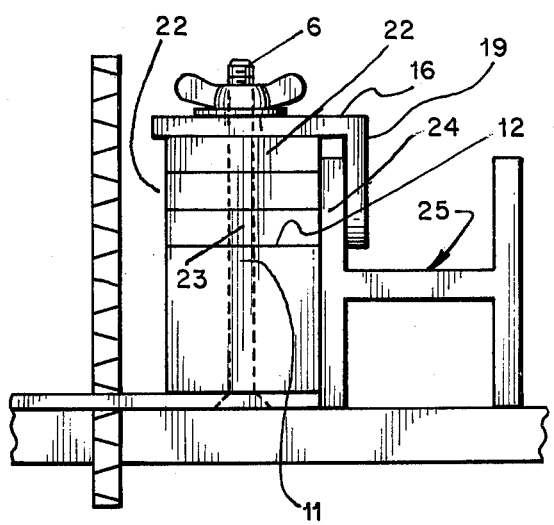
FIG. 3 is a partial end view, similar to FIG. 2, showing the attachment in a different position in association with a guide member having an "H" cross section, in the form of an I-beam, such as in a carpenter's level.

A similar embodiment of the attachment is shown in FIG. 3, except that in this embodiment the first leg 16 of the angle is vertically spaced from the top face 12 of the channel by a plurality of shims 22 which may be in the form of strips or washers. The shims include holes 23 whereby bolts 6 can extend through them and the shims can be secured by the bolts and wing nuts in an integral unit. By adjusting the attachment vertically, it is able to engage one leg 24 of an I-beam guide member, such as an ordinary carpenter's level 25. Lateral adjustment of the attachment is accomplished in the same manner as described with respect to FIG. 2 and need not be repeated. It is apparent from a consideration of FIGS. 2 and 3 that the preferred attachment according to the present invention is adjustable both laterally, that is, to increase or decrease the width of the attachment and vertically, that is, to increase or decrease the height of the attachment with respect to the plane of the workpiece to accommodate any guide member which is conveniently available to a workman at a job site.

To facilitate acceptance of the longitudinal guide members such as angle iron 7 (in FIG. 1), the entry end 26 of the second leg 19 of angle 14 is smoothly curved or bent outwardly away from the line of the cut to be made. The lowermost portion of the leg 19 is bent slightly greater than the uppermost portion thereof.

In a further embodiment of the invention, where it is desirable to increase the distance of the cutting blade or tool from the guide member releasably secured to the workpiece, or for use with certain power tools which do not have a continuous sole plate along the edge adjacent the cutting blade or tool, I propose to use an auxiliary plate 27 either alone or in combination with extension arms 28 as shown in FIG. 4. The main elements of the attachment are as previously described and comprise a channel 10 of rectangular cross section, a shim or shims 22 if necessary, and an angle 14 having a first leg 16 and depending or second leg 19, all secured to the auxiliary plate and/or to the extension arms by threaded bolts 6. The bolts 6 extend upwardly through holes 11 in the channel and shims and through the slots 15 in the angle 14. The unit includes washers 17 and wing nuts 18 threaded to the bolts. The extension arms 28 are fastened to the sole plate by conventional fasteners 29. To prevent the auxiliary plate 27 from shifting with respect to the sole plate 3 of the power tool it may be necessary to utilize more than one fastener in either the auxiliary plate or the sole plate or both on a single extension arm. Utilizing the arrangement shown in FIG. 4, it is possible to place the attachment on the opposite side of the power tool from the cutting blade, a convenience which may be desirable for certain cutting activities. In addition, such an arrangement on the opposite side from that shown in FIG. 1 can and does improve visibility of the cut being made and is particularly helpful for persons who wish to work with the left hand.

In a still further embodiment of the invention, as shown in FIG. 5, an auxiliary plate 27 having an area greater than the sole plate of the power tool is bolted to the sole plate in four locations, only two of which are shown in the Figure. Such an arrangement provides additional rigidity over the arrangement shown in FIG. 4, since the rigidity of the auxiliary plate does not depend upon extension arms, but rather the plate is securely held to the sole plate and acts as a large sole plate. The auxiliary plate and extension arms shown in FIGS. 4 and 5 may be made of metal or plastic, however, it is also contemplated that these components be made of a rigid synthetic material, such as tempered masonite, which has good sliding capability.

In many portable power tools, the plane of the sole plate is adjustable relative to the plane through the cutting blade to enable workpiece edges to be chamfered. If the attachment of the present invention is located on the side of the sole plate nearest the cutting blade, the attachment may be easily removed to permit chamfering by simply removing the holding bolts in the sole plate. If the attachment is on the opposite side of the sole plate, it will not interfere with adjustment of the cutting blade.

It is apparent that although the saw is shown in a position so as to make a straight cut parallel with an edge of the workpiece, the guide member may be located in any position across the workpiece to enable any sort of straight line cut to be made, including mitered joints.

The invention is particularly useful for cutting long workpieces, for example panels of 4 × 8 feet and greater in which, heretofore such straight cuts have not been made without some sort of guiding means and for the tool. However, although such means was desirable, a workman generally was either unable or unwilling to carry with him a guide member sufficiently long to enable the straight line cut to be made.

As previously stated, the elements of my guiding assembly may be made of metal, preferably aluminum, or of a rigid synthetic material, such as plastic, or particularly with respect to the auxiliary plate and extension arms, of a tempered masonite or the like.

Having described presently preferred embodiments of the invention, it is to be understood that the invention may be otherwise embodied within the scope of the appended claims.

I claim:

1. In combination with a portable power tool adapted to cut a straight line along a workpiece and having a sole plate for contacting the workpiece while the cut is being made, the improvement in an attachment for guiding the tool along the workpiece in the line of the cut to be made comprising:
   A. means releasably secured to the sole plate and extending parallel to the line of the cut to be made but spaced laterally therefrom for supporting a guiding means;
   B. guiding means adjustably secured to the supporting means and comprising an L-shaped member including a first leg extending laterally away from the line of the cut to one made and a second leg depending from said first leg, said second leg extending substantially parallel to the supporting means and to the line of the cut to be made, said second leg and said supporting means being adjustably spaced from one another a sufficient distance to provide a space therebetween for receiving a longitudinal member releasably attached to the workpiece and oriented in the direction of the cut to be made, whereby the portable power tool can be used to cut a straight line using any convenient longitudinal member and not one especially designed to cooperate with the guiding means.

2. The combination of claim 1 wherein the supporting means comprises a member having a rectangular cross section and the first leg of the guiding means is located in contact with a top face of the rectangular member.

3. The combination of claim 1 wherein the supporting means comprises a member having a rectangular cross section and at least one shim member, and the first leg of the guiding means is located in contact with the shim member for elevating the first leg with respect to the sole plate of the tool.

4. The combination as set forth in claim 1 wherein the supporting means is secured to the sole plate by two threaded bolts spaced from one another in the direction of the cut to be made and the first leg of the guiding means includes a pair of laterally extending slots through which the shanks of the bolts extend, and nuts threaded to the bolts for tightening the first leg to the spacing means after the first leg has been laterally adjusted with respect to the supporting means so that the second leg is spaced from the supporting means a distance sufficient to provide a space for receiving therein the longitudinal member.

5. The combination of claim 1 wherein the entry end of the guiding means is formed to facilitate acceptance by the attachment of the longitudinal member on the workpiece, said entry end having the second leg bent smoothly outwardly away from the line of the cut with the lowermost portion of the depending leg at the entry end being bent slightly greater than the uppermost portion thereof.

6. The combination of claim 4 wherein the supporting means also includes slots for the bolts and is laterally adjustable with respect to the line of the cut to be made.

7. The combination as set forth in claim 1 wherein an auxiliary plate is secured to the sole plate and extends beyond an edge thereof which is substantially parallel to the line of the cut to be made by the tool and the supporting means is secured to the auxiliary plate, whereby the distance between the line of the cut and the vertical plane of the second leg can be increased.

8. In combination:
   A. a portable power tool adapted to cut a straight line along a workpiece and having a sole plate for contacting the workpiece while the cut is being made; and
   B. a guiding assembly comprising:
   1. means attached to the sole plate and extending parallel to the line of the cut to be made but spaced laterally therefrom for supporting means for guiding the tool along the workpiece in the line of the cut to be made;
   2. guiding means adjustably secured to the supporting means and comprising an L-shaped member including a first leg extending laterally away from the line of the cut, a second leg depending from said first leg and extending substantially parallel to the supporting means and to the line of the cut to be made, said second leg and said supporting means being adjustably spaced from one another; and
   3. a longitudinal guide member releasably secured to the workpiece in the line of the direction of the cut to be made and having an upstanding leg, the space between the second leg and the supporting means being adjusted to closely receive the upstanding leg whereby a straight line can be cut along the workpiece with the power tool.

9. The combination as set forth in claim 8 wherein the supporting means comprises a channel having a rectangular cross section and at least one shim member and the channel is secured to the sole plate with threaded bolts spaced in the direction of the cut, the first leg having slots to accept the bolts and threaded nuts for tightening the first leg on to the supporting means whereby the distance from the first leg to the sole plate can be adjusted and the distance from the second leg to the supporting means can be adjusted to accept any longitudinal guide member releasably secured to the workpiece having an upstanding leg of height and width within the maximum adjustability of the guiding means.

10. The combination as set forth in claim 8 wherein an auxiliary plate is secured to the sole plate and extends beyond an edge thereof which is substantially parallel to the line of the cut such that the distance between the line of the cut to be made and the plane of the second leg can be increased.

11. An attachment for a portable power tool adapted to cut a straight line along a workpiece and having a sole plate for contacting the workpiece while the cut is being made, said attachment for guiding the tool along the workpiece in the line of the cut to be made comprising:
   A. means adapted to be releasably secured to the sole plate in parallel to the line of the cut to be made but spaced laterally therefrom for supporting a guiding means;
   B. guiding means adapted to be adjustably secured to the supporting means and comprising an L-shaped member including a first leg for extending laterally away from the line of the cut to one made and a second leg depending from said first leg, said second leg for extending substantially parallel to the supporting means and to the line of the cut to be made, and means for adjustably spacing said L-shaped member and said supporting means from one another a sufficient distance to provide a space therebetween for receiving a longitudinal member releasably attached to the workpiece and oriented in the direction of the cut to be made, whereby the attachment permits the power tool to be used to cut a straight line using any convenient longitudinal member and not one especially designed to cooperate with the guiding means.

12. The attachment of claim 11 wherein the supporting means comprises a member having a rectangular cross section and the first leg of the guiding means is adapted to be in contact with a top face of the rectangular member.

13. The attachment of claim 11 wherein the supporting means comprises a member having a rectangular cross section and at least one shim member, and the first leg of the guiding means is adapted to be in contact with the shim member spacing the first leg with respect to the rectangular member.

14. The attachment as set forth in claim 11 wherein the supporting means is adapted to be secured to the sole plate by two threaded bolts spaced from one another in the direction of the cut to be made and the first leg of the guiding means includes a pair of laterally extending slots through which the shanks of the bolts extend, and nuts threaded to the bolts for tightening the first leg to the spacing means after the first leg has been laterally adjusted with respect to the supporting means so that the second leg is spaced from the supporting means a distance sufficient to provide a space for receiving therein a longitudinal member releasably attached to the workpiece.

15. The attachment of claim 11 wherein the entry end of the guiding means is formed to facilitate acceptance by the attachment of a longitudinal member on the workpiece, said entry end having the second leg bent smoothly outwardly away from the line of the cut to be made with the lowermost portion of the second leg at the entry end being bent slightly greater than the uppermost portion thereof.

16. The attachment of claim 14 wherein the supporting means also includes slots for the bolts and is laterally adjustable with respect to the line of the cut to be made.

17. The attachment as set forth in claim 11 and including an auxiliary plate adapted to be secured to the sole plate and to extend beyond an edge thereof which is substantially parallel to the line of the cut to be made by the tool and the supporting means is adapted to be secured to the auxiliary plate, whereby the distance between the line of the cut to be made and the vertical plane of the second leg can be increased.

18. The attachment as set forth in claim 17 and including extension arms for connecting the auxiliary plate to the sole plate.

* * * * *